(12) United States Patent
Shifrin

(10) Patent No.: US 12,012,860 B2
(45) Date of Patent: Jun. 18, 2024

(54) SELF CONTAINED HYDRAULIC LOCK APPARATUS

(71) Applicant: MESA ASSOCIATES INC., Madison, AL (US)

(72) Inventor: Salvatore Shifrin, Windham, CT (US)

(73) Assignee: MESA ASSOCIATES, INC., Madison, AL (US)

( * ) Notice: Subject to any disclaimer, the term of this patent is extended or adjusted under 35 U.S.C. 154(b) by 249 days.

(21) Appl. No.: 17/598,513

(22) PCT Filed: Mar. 27, 2020

(86) PCT No.: PCT/US2020/025252
§ 371 (c)(1),
(2) Date: Sep. 27, 2021

(87) PCT Pub. No.: WO2020/198599
PCT Pub. Date: Oct. 1, 2020

(65) Prior Publication Data
US 2022/0145774 A1 May 12, 2022

Related U.S. Application Data

(60) Provisional application No. 62/824,593, filed on Mar. 27, 2019.

(51) Int. Cl.
| *F01D 17/14* | (2006.01) |
| *F01D 17/26* | (2006.01) |
| *F01D 21/02* | (2006.01) |
| *F01D 21/18* | (2006.01) |
| *F03B 15/18* | (2006.01) |

(52) U.S. Cl.
CPC .......... *F01D 17/145* (2013.01); *F01D 17/26* (2013.01); *F01D 21/02* (2013.01); *F01D 21/18* (2013.01); *F03B 15/18* (2013.01); *F05D 2260/904* (2013.01); *F05D 2270/021* (2013.01); *F05D 2270/091* (2013.01); *F05D 2270/64* (2013.01)

(58) Field of Classification Search
CPC .......... F01D 17/26; F01D 21/02; F01D 21/18; F03B 15/18
See application file for complete search history.

(56) References Cited

U.S. PATENT DOCUMENTS

| 4,589,444 | A | * | 5/1986 | Masek | ..................... F15B 15/18 |
| | | | | | 91/437 |
| 5,193,779 | A | * | 3/1993 | Frey | ......................... F01D 17/26 |
| | | | | | 251/30.01 |

(Continued)

OTHER PUBLICATIONS

International Search Report for corresponding PCT Application No. PCT/US2020/025252 dated Jun. 16, 2020.

*Primary Examiner* — Thomas E Lazo
(74) *Attorney, Agent, or Firm* — Maynard Nexsen PC; Brian T. Sattizahn

(57) ABSTRACT

A hydraulic lock apparatus includes a hydraulic actuator, a pressure storage device connected to the hydraulic actuator, and a control valve configured to actuate to a first position and a second position. The control valve fluidly isolates the pressure storage device from the hydraulic actuator when the control valve is in the first position. The control valve fluidly connects the pressure storage device to the hydraulic actuator when the control valve is in the second position.

21 Claims, 5 Drawing Sheets

(56) References Cited

U.S. PATENT DOCUMENTS

| | | | | |
|---|---|---|---|---|
| 5,244,005 A | * | 9/1993 | Hassan | F01D 21/18 |
| | | | | 137/56 |
| 5,295,783 A | * | 3/1994 | Lesko | F01D 17/26 |
| | | | | 415/36 |
| 9,239,064 B2 | * | 1/2016 | Helbig | F15B 1/022 |
| 9,528,534 B2 | * | 12/2016 | Finke | F15B 15/20 |
| 10,041,513 B2 | * | 8/2018 | Böhner | F15B 15/1476 |
| 2012/0240566 A1 | | 9/2012 | Ohtsuka et al. | |
| 2014/0026747 A1 | * | 1/2014 | Finke | F15B 15/20 |
| | | | | 91/160 |
| 2014/0026969 A1 | * | 1/2014 | Helbig | F03D 7/04 |
| | | | | 137/487.5 |
| 2017/0152759 A1 | | 6/2017 | Leykauf | |

* cited by examiner

SELF CONTAINED HYDRAULIC LOCK APPARATUS

CROSS-REFERENCE TO RELATED APPLICATIONS

This application is a National Stage application of International Patent Application No. PCT/US2020/025252, filed on Mar. 27, 2020, which claims priority from U.S. provisional patent application 62/824,593, filed Mar. 27, 2019, each of which is incorporated herein by reference in their entirety.

TECHNICAL FIELD

The present disclosure relates to the field of actuation devices and methods used in industrial machine control.

BACKGROUND

If a machine such as, for example, a hydro turbine becomes unloaded during normal operation, an over speed condition is created and the turbine must be stopped in an orderly manner within a prescribed time period. In the case of a Kaplan Turbine, the braking function is conventionally done with an actuator (e.g., servomotor and screw drive) that drives wicket gates to the closed position. During an over speed event, the conventional control is overridden in order to more quickly shut the wicket gates. Once the shutdown condition is cleared, the actuator (e.g., servomotor and screw drive) drives the wicket gates to the closed position (i.e., home position).

SUMMARY

In accordance with embodiments of the present disclosure, a hydraulic lock apparatus for industrial machinery includes a pre-pressurized gas over fluid accumulator, a differential hydraulic cylinder, a normally open control valve, and a flow control valve that operates as a needle valve in one direction and free flow in the other direction.

In accordance with embodiments of the present disclosure, a hydraulic lock apparatus includes a hydraulic actuator, a pressure storage device connected to the hydraulic actuator, and a control valve configured to actuate to a first position and a second position. The control valve fluidly isolates the pressure storage device from the hydraulic actuator when the control valve is in the first position. The control valve fluidly connects the pressure storage device to the hydraulic actuator when the control valve is in the second position.

In accordance with embodiments according to the present disclosure, a method of operating a hydraulic lock apparatus includes actuating the control valve from the first position to the second position, thereby causing the hydraulic actuator to actuate to an actuated position.

These and other objects, features and advantages of the present disclosure will become apparent in light of the detailed description of embodiments thereof, as illustrated in the accompanying drawings.

DETAILED DESCRIPTION

Figure 1:
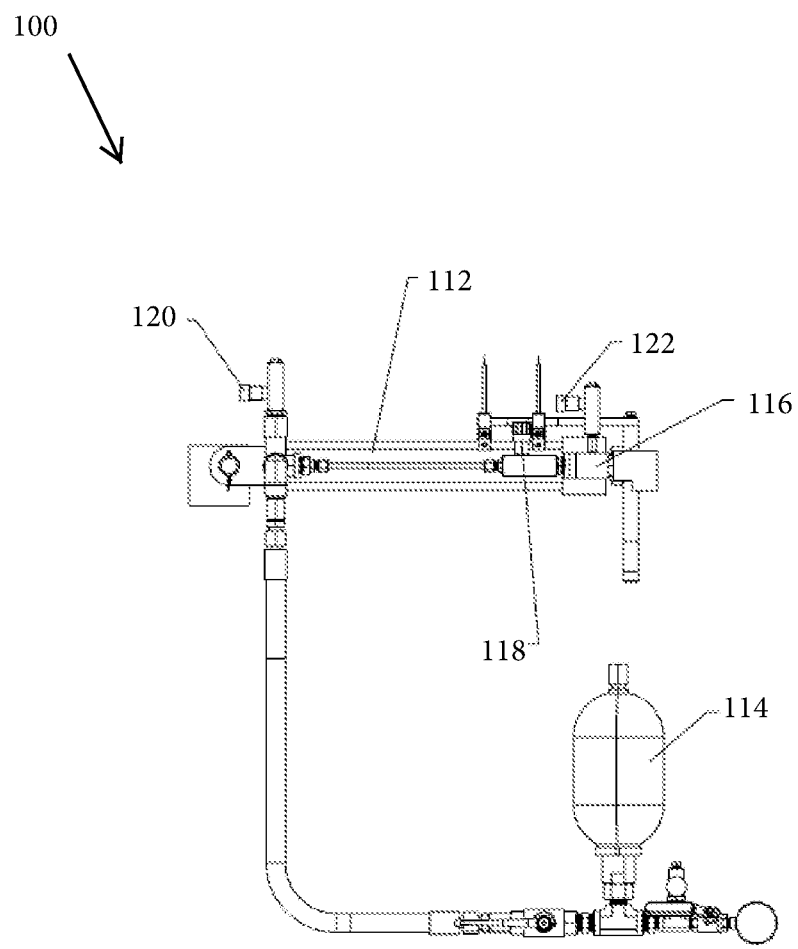
FIG. 1 shows a front view of a hydraulic lock apparatus in a retracted position in accordance with embodiments of the present disclosure.

Non-limiting and non-exhaustive embodiments in accordance with the present disclosure are described below with reference to the accompanying figures, wherein like reference numerals refer to like elements throughout the various views unless otherwise specified.

Referring to FIG. 1, a self-contained hydraulic lock apparatus 100 is shown in accordance with embodiments according to the present disclosure. The apparatus 100 is a self-contained integrated system structure that includes a hydraulic actuator 112, a pressure storage device 114, a control valve 116, a flow control valve 118, a first bleed valve 120, and a second bleed valve 122. The hydraulic actuator 112 is a differential hydraulic cylinder, the pressure storage device 114 is a gas over liquid type accumulator, and the control valve 116 may be an electrically controlled on/off valve or solenoid valve configured to actuate to at least a first position and a second position.

The pressure storage device 114 is preferably a single accumulator with stored pressure, such as compressed gas, that pressurizes a fluid, such as hydraulic oil. The pressure storage device 114 is fluidly connected to the control valve 116 and the control valve 116, in turn, is fluidly connected to both sides of the hydraulic actuator 112 such that the control valve 116 fluidly isolates the pressure storage device 114 from the hydraulic actuator 112 when the control valve is in the first position and fluidly connects the pressure storage device 114 to the hydraulic actuator 112 when the control valve 116 is in the second position. The pressure storage device 114 is charged to an appropriate pressure to operate the self-contained hydraulic lock apparatus 100. The charging of the pressure storage device 114 may be performed on a workbench with the pressure storage device 114 disconnected from the apparatus 100 or, alternatively, with the pressure storage device 114 installed on the apparatus 100 or machine. Where the pressure storage device 114 is an accumulator, as described above, the pressure storage device 114 may be charged with a bladder of the accumulator fully extended with the oil side (i.e. liquid side) of the bladder open to the atmosphere. The hydraulic actuator 112 is pressurized on both ends by the charged pressure storage device 114 when fluidly connected thereto, such as on both ends of a piston where the hydraulic actuator is a differential hydraulic cylinder.

The pressure storage device 114 is connected to the hydraulic actuator 112 to provide actuation pressure to actuate the hydraulic actuator 112 from a reset position to an actuated position. The reset position may be either an extended or retracted position of the hydraulic actuator 112, and the actuated position may be the opposite of the reset position.

The flow control valve 118 is configured as a needle valve in one direction and free flow in the other direction. The flow control valve 118 is configured to adjust the stroke rate of the hydraulic actuator 112. By adjusting the stroke rate, the amount of time required for complete actuation is adjustable. The bleed valves 120, 122 are configured to be actuated, manually or automatically (e.g. by a controller) to bleed pressure/fluid from one or both sides of the hydraulic actuator 112, e.g., from one or both sides of the differential hydraulic cylinder when the hydraulic actuator 112 is a differential hydraulic cylinder.

Figure 2:
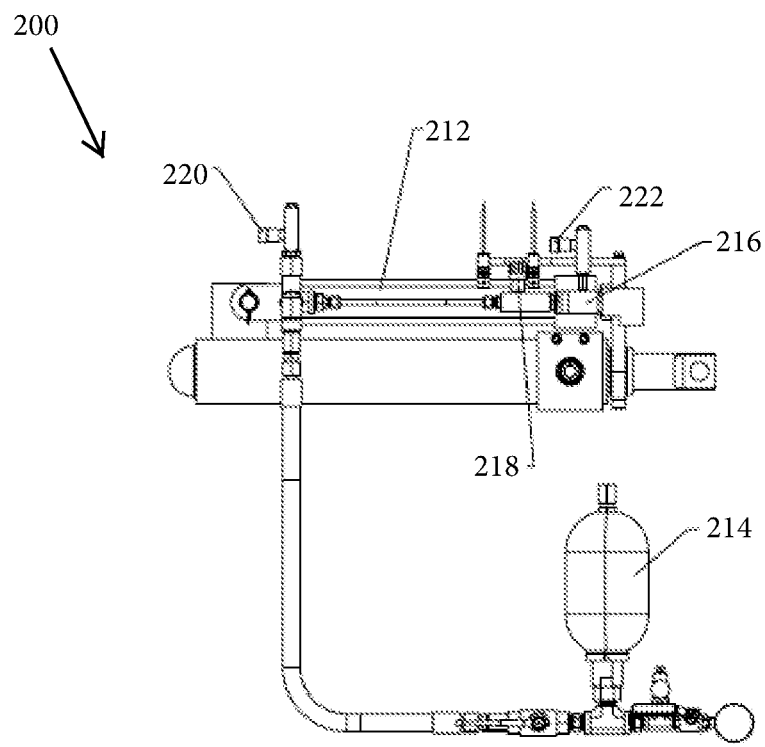
FIG. 2 shows a front view of another hydraulic lock apparatus in a retracted position in accordance with embodiments of the present disclosure.
Figure 3:
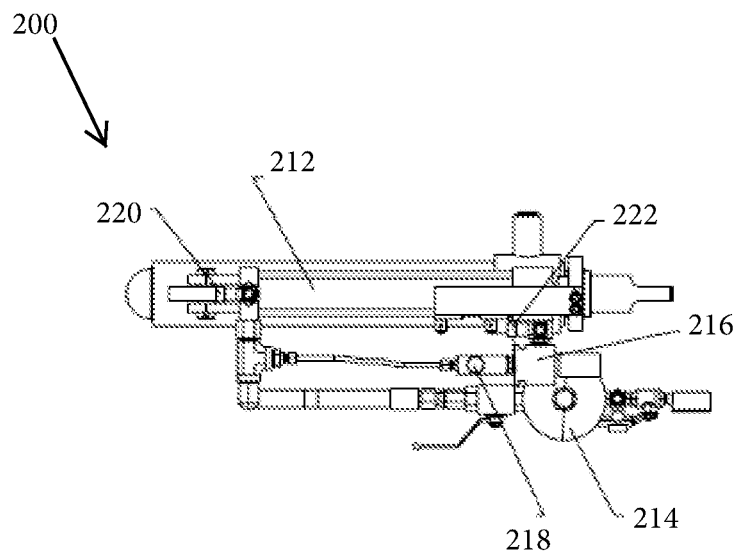
FIG. 3 shows a top view of the hydraulic lock apparatus of FIG. 2 in a retracted position in accordance with embodiments of the present disclosure.
Figure 4:
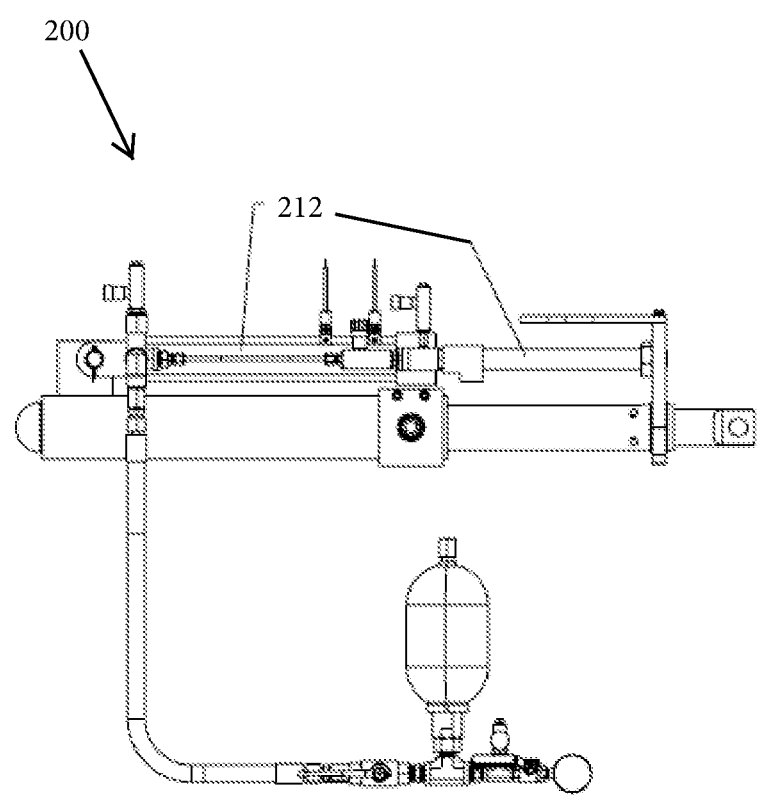
FIG. 4 shows a front view of the hydraulic lock apparatus of FIG. 2 in an extended position in accordance with embodiments of the present disclosure.

Referring to FIGS. 2-4, a self-contained hydraulic lock apparatus 200 is shown in accordance with embodiments of the present disclosure. The apparatus 200 is a self-contained integrated system structure that includes a hydraulic actuator 212, a pressure storage device 214, a control valve 216, a flow control valve 218, a first bleed valve 220, and a second bleed valve 222. The apparatus 200 is configured to actuate between a reset position and an actuated position in the same manner discussed above in connection with FIG. 1. FIGS. 2 and 3 show front and top views, respectively, of the hydraulic actuator 212 in a retracted position and FIG. 4 shows a front view of the apparatus 200 in an extended position in accordance with embodiments of the present disclosure. As discussed above, the retracted position shown in FIGS. 2 and 3 may be the reset position and the extended position shown in FIG. 4 may be the actuated position, or the retracted position shown in FIGS. 2 and 3 may be the actuated position and the extended position shown in FIG. 4 may be the reset position.

The control valve 216 is connected between the pressure storage device 214 and the hydraulic actuator 212 to release pressure from the pressure storage device 214 to actuate the hydraulic actuator 212 from the reset position to the actuated position in the event of a system failure or other undesirable system condition of the machine, such as, for example and without limitation, power loss or over speed.

Figure 5:
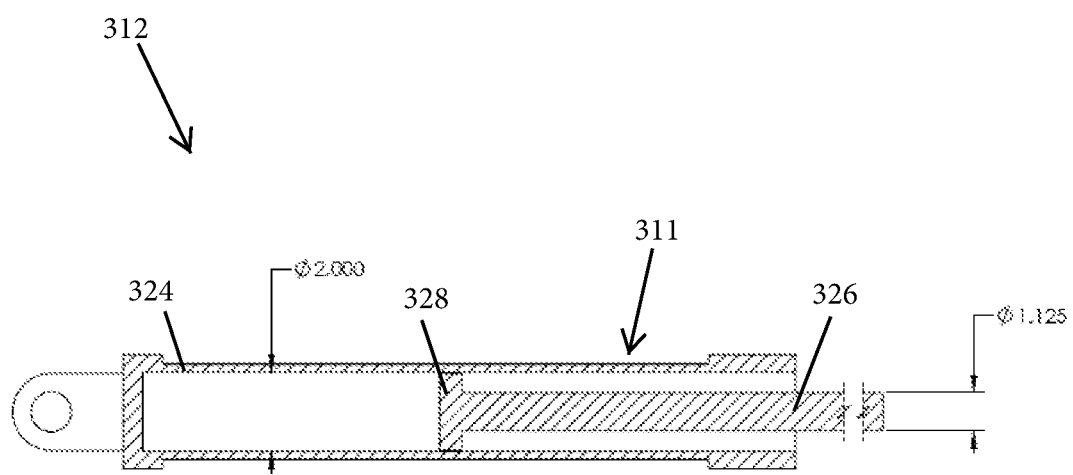
FIG. 5 shows a diagram of a differential hydraulic cylinder in accordance with embodiments of the present disclosure.

Referring to FIG. 5, an exemplary hydraulic actuator 312 is shown in accordance with embodiments of the present disclosure as a differential hydraulic cylinder 311. The exemplary hydraulic actuator 312 may be provided as any of the various hydraulic actuators described herein. The differential hydraulic cylinder 311 includes a cylinder 324, and a piston 326 having a piston head 328. In this exemplary embodiment, the cylinder stroke is 12 inches, the area of the non-rod side is 3.14 square inches, the area of the rod side is 2.15 square inches, and the differential area is 0.994 square inches. The inner diameter of the cylinder 324 is 2 inches and the rod of the piston 326 has a diameter of 1.125 inches. Given that force=pressure×area, an exemplary force of the differential hydraulic pressure cylinder at 1,000 PSI is force=1,000×0.994=994 lbs of actuation force. It should be understood that other types and sizes of differential hydraulic cylinder 311 are within the scope of the present disclosure.

Figure 6:
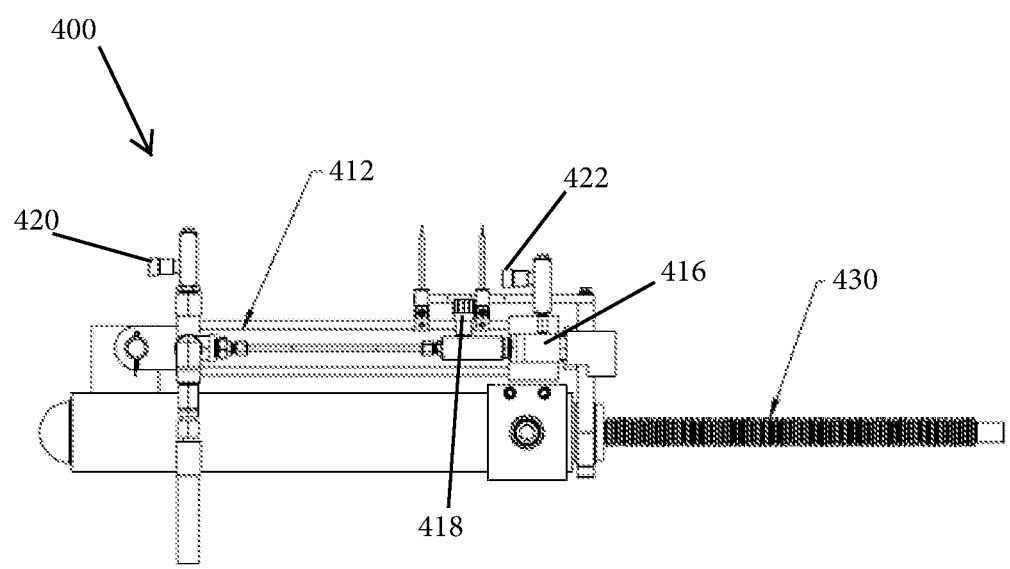
FIG. 6 shows a front view of a hydraulic lock apparatus with a screw drive in accordance with embodiments of the present disclosure.

Referring to FIG. 6, a self-contained hydraulic lock apparatus 400 is shown in accordance with embodiments of the present disclosure. The apparatus 400 is a self-contained integrated system that includes a hydraulic actuator 412, a pressure storage device, a control valve 416, a flow control valve 418, a first bleed valve 420, a second bleed valve 422, and screw drive 430. When the hydraulic actuator 412 is operated to actuate to the actuated position in the same manner discussed above, the hydraulic actuator 412 drives the screw drive 430 to rotate. The threads of the screw drive 430 when driven to rotate are configured to engage with a threaded machine part to open or close a valve, door, port, or other element of a machine.

In operation, the hydraulic lock apparatus 100, 200, 400 is arranged in the reset position (e.g., the hydraulic actuator 112, 212, 312, 412 is in the retracted position) and is held in the reset position by hydraulic lock by maintaining the control valve 116, 216, 416 closed by, for example and without limitation, maintaining electrical power to the electrical control valve 116, 216, 416. When the hydraulic lock apparatus 100, 200, 400 is maintained in the reset position by hydraulic lock, the differential hydraulic cylinder of the hydraulic actuator 112, 212, 312, 412 has equal pressure on both sides, an unequal volume of fluid on each side, and no means for hydraulic fluid to flow in the system.

When the control valve 116, 216, 416 is triggered in the event of a system failure or other undesirable system condition of the machine (e.g., power loss, over speed), the control valve 116, 216, 416 is opened (e.g., by removal of electrical power to the electrical control valve 116, 216, 416) to release energy stored in the pressure storage device 114, 214 and to apply pressure to both sides of the piston inside the differential hydraulic cylinder of the hydraulic actuator 112, 212, 312, 412. In some embodiments, the control valve 116, 216, 416 may be configured to detect the system condition (e.g. power loss, over speed) by a controller integral with the control valve 116, 216, 416 or a separate controller providing a control signal. Since the differential hydraulic cylinder of the hydraulic actuator 112, 212, 312, 412 has a smaller area on the rod side of the piston 326 in relation to the head 328 side of the piston 326, the force applied on the rod side of the differential hydraulic cylinder of the hydraulic actuator 112, 212, 312, 412 is less than the force applied on the head side of the differential hydraulic cylinder of the hydraulic actuator 112, 212, 312, 412 (e.g., see FIG. 5). When equal pressure is applied to both sides of the hydraulic cylinder of the hydraulic actuator 112, 212, 312, 412, the pressure causes or results in the rod of the hydraulic cylinder of the hydraulic actuator 112, 212, 312, 412 to actuate to the actuated position. In this state, the differential hydraulic cylinder of the hydraulic actuator 112, 212, 312, 412 has equal pressure on both sides of the piston 326 and a means for hydraulic fluid to flow in the system forcing the rod of the differential hydraulic cylinder of the hydraulic actuator 112, 212, 312, 412 to the actuated position. Thus, in the event of a system failure or other undesirable system condition of the machine, the hydraulic lock apparatus 100, 200, 400 is actuated from a reset position (e.g., the hydraulic cylinder is in the retracted position) to an actuated position (e.g., the hydraulic cylinder is in the extended position) and then locked in the actuated position.

When the trigger condition is cleared and the machine is ready to be returned to normal operation, the hydraulic lock apparatus 100, 200, 400 is reset by maintaining the control valve open (e.g., by providing no electrical power to the electrical control valve) and actuating the hydraulic lock apparatus 100, 200, 400 from the actuated position (e.g., extended position) to the reset position (e.g., the hydraulic cylinder is in the retracted position). By maintaining the control valve open 116, 216, 416 (e.g., by providing no electrical power to the electrical control valve 116, 216, 416), the hydraulic lock apparatus can be changed from the actuated position (e.g., extended position) to the reset position (e.g., the hydraulic cylinder is in the retracted position). For example, the rod of the differential hydraulic cylinder of the hydraulic actuator 112, 212, 312, 412 can be forced in the reverse direction by the normal existing actuation means of the machine control. The normal existing actuation means of the machine control can be, for example, a motor and jackscrew, another hydraulic actuator, or any other type or number of mechanical means. Reversing the actuation of the differential hydraulic cylinder forces the fluid back into the pressure storage device 114, 214 thus pressurizing the gas in the pressure storage device 114, 214 back to the original pressure (or substantially the same pressure as the original pressure). Once the differential hydraulic cylinder of the hydraulic actuator 112, 212, 312, 412 is back in the reset position (e.g., the hydraulic cylinder is in the retracted position) the control valve 116, 216, 416 is closed (e.g., by providing electrical power to the electrical control valve) causing the differential hydraulic cylinder of the hydraulic actuator 112, 212, 312, 412 to be held in the reset position by hydraulic lock allowing for normal operation of the machine. Thus, upon clearing of the undesirable system condition of the machine, the hydraulic lock apparatus 100, 200, 400 is actuated from the actuated position (e.g., the hydraulic cylinder is in the extended position) to the reset position (e.g., the hydraulic cylinder is in the retracted position) and locked in the reset position.

The apparatuses 100, 200, 400 according to the present disclosure are also configured or adapted to be connected to a machine to provide mechanical actuation of a function of the machine. Accordingly, the hydraulic cylinder is configured to be located and connected to the machine between a controlled device and a controlling drive, or in a position to move a critical or non-critical component of the machine depending on the application.

The present disclosure provides a compact self-contained hydraulic lock apparatus 100, 200, 400 that performs mechanical actuation under one or more predetermined condition(s). There are many industrial applications for using the present hydraulic lock apparatus 100, 200, 400 and method of operating a hydraulic lock apparatus. For example and without limitation, the self-contained hydraulic lock apparatus 100, 200, 400 may be used to override existing controls on an industrial machine to protect equipment in various ways. For example and without limitation, the present hydraulic lock apparatus 100, 200, 400 may be actuated and locked in an actuated position (e.g., either an extended or retracted position of a hydraulic actuator) to mechanically support critical parts of the machine in the event of a system failure or undesirable system condition of the machine (e.g., power loss, over speed). Further, critical functions that would normally be impossible to actuate in the event of power loss to the machine controls can be actuated using the present hydraulic lock apparatus.

A preferred embodiment of the hydraulic lock apparatus 100, 200, 400 operates on the principles of stored recoverable energy, with a differential hydraulic cylinder as the hydraulic actuator 112, 212, 312, 412 of the hydraulic lock by means of an electrically controlled valve 116, 216, 416 as described above. The electrically controlled valve 116, 216, 416 opens to release the stored energy to provide the necessary force to extend the differential hydraulic cylinder of the hydraulic actuator 112, 212, 312, 412 into the actuated position and maintain the hydraulic cylinder of the hydraulic actuator 112, 212, 312, 412 in the actuated position by hydraulic lock. Energy is returned when the differential hydraulic cylinder of the hydraulic actuator 112, 212, 312, 412 is retracted and returned to the reset position, and the electrically controlled valve 116, 216, 416 is closed to maintain the hydraulic cylinder of the hydraulic actuator 112, 212, 312, 412 in the reset position by hydraulic lock and store the energy.

While the pressure storage device 114, 214 has been shown and described as being a single pressure storage device, it is within the scope of the present disclosure for a plurality of pressure storage devices, of the same type or different types, to perform the function of the pressure storage device 114, 214. While the control valve 116, 216, 416 has been shown and described as being an electrically controlled valve, it is within the scope of the present disclosure for the control valve 116, 216, 416 to be a different type of valve, such as and without limitation, a mechanically controlled valve.

The hydraulic lock apparatus 100, 200, 400 is configured to be mounted in different configurations depending on the application. It may be coupled with the existing controls of a machine to override the normal actuation means, or it may be mounted anywhere on the machine to actuate safety measures upon loss of power and/or a control signal to the machine.

An example application of an embodiment the hydraulic lock apparatus 400 in accordance with the present disclosure is an over speed shutdown mechanism that provides a braking system for a hydro turbine power generator. An output connection of the differential hydraulic cylinder 412 of the hydraulic lock apparatus 400 may be connected to open and close the wicket gates of a hydro turbine power generator. The hydraulic lock apparatus 400 is coupled with the servomotor and screw drive that operate the wicket gates of the hydro turbine power generator during normal operation. The servomotor and screw drive 430 are part of the wicket gate drive control assembly (shown in FIG. 6) that close the wicket gates in response to an over speed condition and reopen the wicket gates for normal turbine operation. Under normal operation of the hydro turbine power generator, the wicket gates are opened by closing the control valve 416 (e.g., by maintaining electrical power to the electrical control valve) and holding the hydraulic lock apparatus 400 in the reset position with the screw drive 430 fully extended and the wickets closed (e.g., the hydraulic actuator 412 is in the retracted position) by hydraulic lock. When a trigger event is detected (e.g., over speed condition), the wicket gates are closed by opening the control valve 416 (e.g., by removal of electrical power to the electrical control valve) and actuating the hydraulic lock apparatus 400 from a reset position (e.g., the hydraulic cylinder is in the retracted position) to an actuated position (e.g., the hydraulic actuator 412 is in the extended position) and maintaining the actuated position by hydraulic lock. This actuation extends the hydraulic actuator 412 and closes the wicket gates regardless of the current position of the screw drive 430.

When the trigger condition is cleared and the machine is ready to be returned to normal operation, the control valve 416 is kept open (e.g., by providing no electrical power to the electrical control valve, or at least less electrical power than the electrical power needed to maintain the valve 416 in the closed position) to actuate the hydraulic lock apparatus 400 from the actuated position (e.g., extended position) to the reset position (e.g., retracted position). For example, the rod of the differential hydraulic cylinder of the hydraulic actuator 412 can be forced in the reverse direction by operation of the existing servomotor and jackscrew 430 that operate the wicket gates of the hydro turbine power generator. Once the differential hydraulic cylinder of the hydraulic actuator 412 is back in the reset position (e.g., retracted position) the control valve 416 is closed (e.g., by providing electrical power to the electrical control valve) causing the differential hydraulic cylinder of the hydraulic actuator 412 to be held in the reset position (e.g., closed wicket gates) by hydraulic lock allowing for normal operation of the hydro turbine power generator.

The hydraulic lock apparatus 100, 200, 400 according to the present disclosure provides a number of advantages. For instance, electrical/hydraulic controls for industrial machines are generally configured with a pressure system external to the actuator such as pressurized nitrogen, or pressurized air acting on hydraulic fluid. This external pressure system will by necessity contain a compressor or pump, a tank, and other related plumbing. The system will also generally include multiple electrical controls to isolate one side of a cylinder while pressurizing the other side of the cylinder. This type of system has the potential for pump failure, fluid or compressed gas leaks, and multiple points of electrical failure that are eliminated by the present invention. The integrated self-contained hydraulic lock apparatus 100, 200, 400 of the present disclosure includes a dedicated pressure storage device 114, 214 that eliminates the need for a separate constant pressure source, such as, e.g., a hydraulic pump or a compressed gas system.

The integrated self-contained hydraulic lock apparatus 100, 200, 400 of the present disclosure is configured or adapted to be actuated and reset without human intervention. Further, the hydraulic lock apparatus 100, 200, 400 of the present disclosure has the added benefit of allowing the hydraulic actuator to be reset to the ready position by use of the existing drive device of the machine control on which it is installed once the undesirable condition is cleared. The hydraulic lock apparatus 100, 200, 400 provides for the adjustment of the timing of the actuation (manually or automatically depending on the use of a mechanical valve or an electronic valve 116, 216, 416 capable of control).

All of the components of the hydraulic lock apparatus 100, 200, 400 may be assembled into one integrated unit including bleed valves 120, 122, 220, 222, 420, 422. Accordingly, the hydraulic lock apparatus 100, 200, 400 is configured or adapted to be implemented in various applications and is adapted to retrofit existing machines.

While the present disclosure has been illustrated and described with respect to particular embodiments thereof, it should be appreciated by those of ordinary skill in the art that various modification to this disclosure may be made without departing from the spirit and scope of the present disclosure.

What is claimed is:

1. A hydraulic lock apparatus for industrial machinery comprising:
    a pre-pressurized gas over fluid accumulator;
    a differential hydraulic cylinder;
    a normally open control valve;
    a flow valve which operates as a needle valve in one direction and free flow in the other direction;
    a hydraulic actuator; and
    wherein the hydraulic lock apparatus is configured to maintain the hydraulic actuator in a reset position until a system failure condition is triggered, and then control the control valve to cause the hydraulic actuator to move to an actuated position.

2. The hydraulic lock apparatus according to claim 1, wherein when the control valve is closed, the pressure applied to the hydraulic cylinder causes it to remain stationary in a locked position.

3. The hydraulic lock apparatus according to claim 2, wherein the control valve is electrically controlled, and when the control valve is opened, the pressure applied to the hydraulic cylinder causes it to extend at a controlled variable rate.

4. A hydraulic lock apparatus comprising:
    a hydraulic actuator;
    a pressure storage device connected to the hydraulic actuator;
    a control valve configured to actuate to a first position and a second position;
    wherein the control valve fluidly isolates the pressure storage device from the hydraulic actuator when the control valve is in the first position and fluidly connects the pressure storage device to the hydraulic actuator when the control valve is in the second position; and
    wherein the hydraulic lock apparatus is configured to maintain the hydraulic actuator in a reset position until a system failure condition is triggered, and then control the control valve to cause the hydraulic actuator to move to an actuated position.

5. The hydraulic lock apparatus according to claim 4, wherein the hydraulic actuator is a differential hydraulic cylinder.

6. The hydraulic lock apparatus according to claim 5, wherein the differential hydraulic cylinder comprises a first end and a second end opposite the first end, and
    wherein the control valve fluidly isolates the pressure storage device from both the first end and the second end of the differential hydraulic cylinder when the control valve is in the first position and fluidly connects the pressure storage device to both the first end and the second end of the differential hydraulic cylinder when the control valve is in the second position.

7. The hydraulic lock apparatus according to claim 4, wherein the control valve is an electrically controlled valve.

8. The hydraulic lock apparatus according to claim 7, wherein the electrically controlled valve is configured to actuate from the first position to the second position upon a system failure or system condition triggering the electrically controlled valve.

9. The hydraulic lock apparatus according to claim 8, wherein the electrically controlled valve is configured to be kept in the first position by providing electrical power to the electrically controlled valve, and wherein the electrically controlled valve is configured to actuate to the second position when no electrical power is provided to the electrically controlled valve.

10. The hydraulic lock apparatus according to claim 8, wherein the system failure or the system condition is a power loss.

11. The hydraulic lock apparatus according to claim 8, wherein the system failure or the system condition is an over speed of a machine element.

12. The hydraulic lock apparatus according to claim 4, wherein the pressure storage device is an accumulator.

13. The hydraulic lock apparatus according to claim 4, wherein the pressure storage device comprises a plurality of pressure storage devices.

14. The hydraulic lock apparatus according to claim 4, wherein when the control valve fluidly connects the pressure storage device to the hydraulic actuator when the control valve is in the second position, the hydraulic actuator actuates to an actuated position from a reset position.

15. The hydraulic lock apparatus according to claim 14, wherein the actuated position is an extended position of the hydraulic actuator.

16. The hydraulic lock apparatus according to claim 14, wherein the actuated position is a retracted position of the hydraulic actuator.

17. The hydraulic lock apparatus according to claim 4, wherein the hydraulic lock apparatus is a self-contained integrated structure.

18. The hydraulic lock apparatus according to claim 4, wherein the pressure storage device is repressurized through the act of moving the actuator from the actuated position back to the reset position without a pump.

19. A method of operating a hydraulic lock apparatus, the hydraulic lock apparatus comprising:
    a hydraulic actuator;
    a pressure storage device connected to the hydraulic actuator;
    a control valve configured to actuate to a first position and a second position;
    wherein the control valve fluidly isolates the pressure storage device from the hydraulic actuator when the control valve is in the first position and fluidly connects the pressure storage device to the hydraulic actuator when the control valve is in the second position;
    wherein the hydraulic lock apparatus is configured to maintain the hydraulic actuator in a reset position until a system failure condition is triggered, and then control the control valve to cause the hydraulic actuator to move to an actuated position;
    the method comprising:
    actuating the control valve from the first position to the second position, thereby causing the hydraulic actuator to actuate to an actuated position.

20. The method according to claim 18, wherein the hydraulic actuator is a differential hydraulic cylinder.

21. The method according to claim 18, wherein the control valve is an electrically controlled valve, and wherein the method further comprises:
    removing electrical power from the electrically controlled valve to actuate the electrically controlled valve from the first position to the second position.

* * * * *